United States Patent [19]

Ward

[11] 4,002,575
[45] Jan. 11, 1977

[54] REJUVENATION OF SUPPORTED GROUP VIII METAL CATALYSTS
[75] Inventor: John W. Ward, Yorba Linda, Calif.
[73] Assignee: Union Oil Company of California, Los Angeles, Calif.
[22] Filed: Aug. 14, 1975
[21] Appl. No.: 604,818
[52] U.S. Cl. .................... 252/411 R; 208/111; 252/412; 252/416; 252/455 Z
[51] Int. Cl.² .................. B01J 23/96; B01J 29/38; C10G 13/02
[58] Field of Search ............. 252/420, 411 R, 416, 252/455 Z, 412; 208/110, 111

[56] References Cited
UNITED STATES PATENTS

| 3,367,885 | 2/1968 | Rabo et al. ............... 252/455 Z |
| 3,450,644 | 6/1969 | Lanewala et al. ............ 252/420 |
| 3,842,114 | 10/1974 | Sie ........................ 252/455 Z |
| 3,899,441 | 8/1975 | Hansford ................... 252/411 R |

*Primary Examiner*—Winston A. Douglas
*Assistant Examiner*—P. E. Konopka
*Attorney, Agent, or Firm*—Lannas S. Henderson; Richard C. Hartman; Dean Sandford

[57] ABSTRACT

Zeolite-supported Group VIII metal hydrogenation catalysts which have undergone damage by thermal and/or hydrothermal stresses, resulting in a maldistribution of the supported metal, are rejuvenated in activity by (1) vapor phase hydration-ammoniation, followed by (2) calcination to effect substantially complete deammoniation and dehydration of the catalyst, and (3) controlled partial rehydration. The partial rehydration step is the critical novel feature of the invention.

11 Claims, No Drawings

REJUVENATION OF SUPPORTED GROUP VIII METAL CATALYSTS

BACKGROUND AND SUMMARY OF INVENTION

It is well known that maximum activity of the Group VIII metals for hydrogenation reactions depends upon maintaining the metal in a finely divided state such that there is a maximum ratio of surface area to mass. Perhaps the most common method of achieving a high degree of dispersion involves impregnating salts of the Group VIII metals upon porous solid supports, followed by drying and decomposing of the impregnated salt. On non-zeolitic supports, the drying and calcining operations often bring about a substantial migration and agglomeration of the impregnated metal, with resultant reduction in activity. In more recent years, with the advent of highly active crystalline zeolite catalysts of the aluminosilicate type, it has become common practice to ion exchange the desired metal salt into the zeolite structure in an attempt to achieve an ionic bond between each metal atom and an exchange site on the zeolite, thus achieving the ultimate in dispersion of metal while also bonding the metal to the zeolite in such manner as to minimize migration and agglomeration during the drying and calcining steps. This ion exchange technique is particularly desirable in the case of dual-function catalysts such as hydrocracking catalysts wherein it is desirable to maintain an active hydrogenating site closely adjacent to an acid cracking site. These efforts have met with varying degrees of success.

Even though the above described ion-exchange techniques can give a high degree of initial dispersion of metal on the support, conditions encountered during subsequent use of the catalyst may bring about a maldistribution of the metal with resultant reduction in activity, independently of normal deactivating phenomena such as coking, fouling, poisoning, etc. Overheating, or contact with excessive partial pressures of water vapor at high temperatures, such as may occur during oxidative regeneration of the catalyst, may bring about migration of the active metal away from the exchange sites, and this migration may ultimately result in substantial agglomeration of the Group VIII metal. Such agglomeration is not reversible by conventional oxidative regeneration techniques.

In U.S. Pat. No. 3,899,441 to Hansford a method is disclosed for at least partially redispersing Group VIII metals which have become agglomerated as above described. According to this method, the deactivated catalyst, in an oxidized or sulfided state, is subjected to a hydration-ammoniation treatment involving the adsorptive saturation of the catalyst with water vapor and ammonia, followed by careful drying and calcination to effect deammoniation. This treatment brings about a substantial redispersal of the Group VIII metal, with resultant recovery of most or all of the hydrogenation activity not recoverable by conventional oxidative regeneration.

The mechanism by which the Hansford rejuvenation process operates is believed to involve formation of a soluble metal ammino-hydroxide in the pores of the catalyst. Hydration and ammoniation of the deactivated catalyst fills the micropores with a strong aqueous ammonia solution, resulting in dissolution of the metal oxide or sulfide in the ammonia solution in the form of a soluble ammino-hydroxide. For example, palladium oxide on the zeolite support will form the $Pd(NH_3)_4^{++}$ ion, which then migrates back to the original ion exchange sites. The original distribution of palladium is then theoretically obtained after drying and recalcining. Similarly, platinum oxide on amorphous silica-alumina will form $Pt(NH_3)_4(OH)_2$ or $Pt(NH_3)_6(OH)_4$ which, being stronger bases than $NH_4OH$, will tend to combine with the original acid sites on the support. The original distribution of platinum with respect to acid sites will then theoretically be obtained after drying and calcining.

In practicing the rejuvenation process of Hansford, the degree of recovery of fresh activity of the catalyst depends to a large extent upon the extent of agglomeration which has taken place. In cases where metal agglomeration is minimal, the Hansford process can effect a complete recovery of fresh activity, and even in some cases better than fresh activity. In the case of severely damaged catalysts however it has been found very difficult to achieve complete recovery of fresh activity with the Hansford process alone. I have now discovered however that, following the hydration-ammoniation-calcination rejuvenation of Hansford, a substantial additional recovery of activity can be achieved by the simple expedient of partially rehydrating the catalyst prior to final activation in hydrogen. This additional recovery of activity appears to involve some change in disposition of the Group VIII metal, but at present it is uncertain as to whether this change involves additional redispersal, or perhaps some type of migration of the metal to more desirable sites. A very puzzling aspect of the invention resides in the fact that complete rehydration followed by drying and calcination actually decreases the activity of the catalyst. It is hence a critical feature of the invention to rehydrate the catalyst only to an extent of less than about 80% of its adsorptive capacity for water, measured in terms of weight loss which the catalyst undergoes upon heating for 2 hours at 1000° C, after first being equilibrated with water-saturated air at 70° F.

DETAILED DESCRIPTION

A. Initial Hydration-Ammoniation

These steps may be carried out by any procedure which will give a substantial adsorption of water or water vapor into the micropores of the catalyst and adsorption-solution of a substantial proportion, at least about 5 weight-percent and preferably 10 to 35 weight-percent, of ammonia into the adsorbed water phase, based on the weight of the water phase. Preferably, the catalyst is first hydrated and then ammoniated, but simultaneous hydration and ammoniation is also contemplated. In the preferred procedure, the catalyst is simply hydrated in moist air to an extent of e.g., 5–40 weight-percent, and then contacted with gaseous ammonia until the liquid water phase is substantially saturated with ammonia. The hydration and ammoniation steps are preferably carried out at temperatures between about 0° and 150° F, but temperatures up to about 300° F or even higher are contemplated. Normally these steps are carried out at atmospheric pressure, but reduced or superatmospheric pressures may be utilized.

For treating large batches of catalyst, it is usually desirable to hydrate by passing moist air or other wet gas through a bed of the catalyst until there is a substantial breakthrough of water vapor in the effluent gases. Ammoniation may be similarly effected by passing ammonia-containing gases through the bed until ammonia appears in the off gases. Simultaneous hydration and ammoniation can be effected by passing a gas stream containing both ammonia and water vapor through the catalyst bed until both water vapor and ammonia appear in the off gases.

In any of the above procedures, it will be understood that in cases where the zeolite base is in a hydrogen or "decationized" form, the ammoniation will at least partially convert the zeolite to an ammonium zeolite, in addition to saturating the adsorbed water with ammonia. The dissolved ammonia is mostly removed during the subsequent drying step, while the zeolitic ammonium ions are removed predominantly by combustion during the calcining step.

Normally the desired redistribution of active metal on the zeolite base takes place rapidly, i.e., within about 10–30 minutes following hydration and ammoniation, and hence the drying step can be commenced substantially immediately thereafter. However, in some cases, as for example where a substantial agglomeration of metal has occurred, it may be desirable to age the catalyst in its hydrated-ammoniated form for periods ranging from about one hour to twelve hours or more.

B. Drying Step

An initial partial drying at temperatures below 500° F is essential in a practical sense, though perhaps not from an abstract theoretical standpoint. The desired ultimate objective of converting the catalyst to a deammoniated, oxidized form by calcining could be achieved by a carefully controlled rapid heatup to, e.g., 950° F in air, but to achieve maximum catalytic activity in this manner would be very difficult. The reason for this stems from the observed fact that at temperatures between about 500° and 950° F the metal on the catalyst, when in an oxidized state, tends to undergo severe agglomeration unless the water vapor partial pressure is carefully controlled. Hence, a rapid heatup in air would tend to raise the catalyst temperature to above 500° F before some portions of the catalyst bed (or even some areas of each catalyst pellet) had been sufficiently dehydrated to permit control of localized water vapor concentrations. In general, in order to avoid agglomeration of oxidized metal on the catalyst in the 500°–950° F temperature range, the water vapor partial pressure should be maintained below about 10 psi, and preferably below 2 psi. At below about 500° F, the metal or metal oxide is not affected by water vapor.

Accordingly, for the above purposes, the drying step may be carried out by passing a stream of air or other non-reducing gas through a bed of the catalyst without initially maintaining dewpoint control over the effluent gases. It is generally preferable to start the drying at temperatures of, e.g., 100° to 200° F, and incrementally raise the stripping gas temperature to a level in the 300° to 500° F range. During the drying step, nearly all of the ammonia absorbed into the water phase in the catalyst is removed, any remaining ammonia being primarily in the form of zeolitic ammonium cations. It is this zeolitic ammonium which creates an additional problem of water vapor partial pressure control during the subsequent calcination step, for it is in the latter step that zeolitic ammonium is oxidized to form additional water vapor (and nitrogen), which adds its effect to that of the water vapor generated by desorption of any remaining water in the catalyst. Hence the practical necessity for stripping out at least about one-half, and preferably at least about two-thirds of the adsorbed water during the initial drying at temperatures below about 500° F.

It is to be noted also that reducing gases such as hydrogen should be substantially absent during the drying step. For reasons which are not clearly understood, direct reduction of the complex metal ammine cation to the free metal always results in severe agglomeration thereof. Hence the necessity for first converting the metal ammino complex to an oxidized state during the drying and/or calcining steps, and then later reducing the oxidized metal to activate the same for use in hydrocarbon conversions. Suitable stripping gases for use in the drying step include air or other oxygen-containing gases, nitrogen, argon, methane and the like. The drying is preferably carried out at atmospheric pressures, or slightly elevated pressures of e.g., 50 to 100 psig.

C. Calcination Step

The calcination step may be performed in the same apparatus employed for the drying step if desired, e.g., in a rotary kiln, a moving belt furnace, or in a vessel containing a fixed bed of the catalyst. To initiate the calcination, air is admixed with the stripping gas, initially in small proportions to provide an oxygen concentration of e.g., about 0.1% to 1% by volume. The temperature of the calcination gas is then gradually increased from about 500° F to 700°–750° F while gradually increasing the oxygen concentration to e.g., about 0.5% to 2%. During the entire heatup period, water concentration in the calcination vessel should be carefully controlled, as by monitoring the effluent gases to maintain a dewpoint below about 40° F, preferably below 20° F. Following each incremental increase in oxygen concentration it is generally desirable, in the case of fixed bed calcinations, to wait for the exothermic temperature wave to pass through the catalyst bed until oxygen breakthrough has occurred before the next incremental increase in oxygen concentration is effected. Continuing in this manner, inlet gas temperatures and oxygen concentrations are increased until temperatures of about 900° to 1100° F, and final oxygen concentrations in the range of about 2–10% or more, are reached. When the terminal temperature and oxygen concentrations are reached, the calcination is then preferably continued for a sufficient length of time to give an effluent gas stream having a dewpoint below about 0° F, preferably below about −20° F.

The gradual heatup procedure with incremental increases in oxygen concentration as described above is a practical necessity when the calcination is carried out with a fixed bed of catalyst through which the calcination gases are passed. It is not intended however that the invention be limited to this procedure, for a considerably more rapid heatup at high oxygen concentrations can be utilized when the catalyst is arranged in thin layers through which the gases pass, whereby the effect of water vapor on downstream portions of the catalyst is minimized. Commercially, a rotary kiln equipped with lifters and a dry air sparger to provide good ventilation of the cascading bed of catalyst is very effective. A particularly critical period during the calcination is the period of burnoff of zeolitic ammonium ions, which occurs primarily at temperatures above about 550° F and can generate a burning wave in the catalyst wherein instantaneous temperatures and water vapor concentrations may inhibit full recovery of activity. Accordingly, greatest care should be exercised to minimize water vapor concentrations during the 550°–1000° F heating cycle.

Final water content of the calcined zeolite should be less than about 25%, preferably about 10–20%, of its adsorptive capacity for water. As employed herein, the term "adsorptive capacity" means the weight loss (LOI) which the catalyst undergoes upon heating for 2 hours at 1000° C, after first being equilibrated with water-saturated air at 70° F. By definition, the so-equilibrated catalyst is "saturated" with water.

D. Partial Rehydration

The partial rehydration step may in general be carried out by methods described above for the initial hydration. However, certain critical precautions must be observed in order to prevent full rehydration of the catalyst, for it has been found that when full hydration is allowed to occur, even a very slow and careful subsequent drying (during activation in flowing hydrogen) fails to prevent loss of activity, relative to the activity found prior to rehydration. Controlled partial rehydration can be effected simply by exposing shallow, agitated beds of the catalyst to the atmosphere for limited periods of time. Alternatively, in deep bed rehydration, wherein a stream of hydrating gas is passed through a stationary bed of the catalyst, the inlet temperature of the hydrating gases should be controlled so as to permit the entire bed to become partially rehydrated without over-hydrating the catalyst nearest the gas influent end of the catalyst bed. A preferred partial rehydration gas comprises a mixture of about 10–50 volume-percent of steam in 90–50 volume-percent of air. It may be desirable to recycle the hydrating gases through the catalyst bed in order to obtain more uniform moisture distribution.

Since various zeolites differ in their adsorptive capacity for water, it is difficult to prescribe absolute and general limitations on permissible maximum water contents. However, as a general rule the hydration should be carried only to the extent of about 10–80 percent, preferably 20–60 percent, of the adsorptive water capacity of the zeolite. Any degree of rehydration below 80% of the adsorptive capacity is beneficial to some extent. The adsorptive capacity of catalysts based on Y zeolite generally ranges between about 17–25 weight-percent. For such Y zeolite catalysts, the partial rehydration should be carried only to the extent of adsorbing about 3–15 weight-percent, preferably about 5–12 weight-percent, of water. Amounts in excess of 15 weight-percent have been found to degrade rather than enhance the activity of the catalyst, even though subsequent drying is carried out under slow and carefully controlled conditions.

E. Final Activation

Following partial rehydration, the catalyst is activated for about 2–40 hours in a stream of essentially dry hydrogen at gradually increasing temperatures terminating between about 600° and 800° F. This activation converts the oxides of the active metals to more active reduced forms, with concurrent evolution and removal of chemical water. It also strips the catalyst of at least a portion of the water added by rehydration.

F. Catalyst Compositions

Catalyst compositions which may be rejuvenated by the above procedures include hydrogenation catalysts, hydrocracking catalysts, isomerization catalysts, reforming catalysts and the like which comprise a Group VIII metal, with or without other metals or metal oxides such as those of the Group VIB metals, supported on a siliceous zeolite base having an ion exchange capacity of at least about 0.01 meq/gm, and preferably at least about 0.1 meq/gm. Suitable siliceous zeolite bases include for example the crystalline aluminosilicate molecular sieves such as the Y, X, A, L, B and $\Omega$ crystal types, as well as zeolites found in nature such as for example mordenite, stilbite, heulandite, ferrierite, dachiardite, chabazite and the like. The preferred crystalline zeolites are those having crystal pore diameters between about 8–12 A, wherein the $SiO_2/Al_2O_3$ mole ratio is about 3/1 to 10/1. For most catalytic purposes, e.g., catalytic hydrocracking, it is preferable to replace most or all of the zeolitic sodium and/or potassium normally associated with such zeolites with other cations, particularly hydrogen ions and/or polyvalent metal ions such as magnesium, calcium, zinc, rare earth metals and the like.

In addition to the crystalline zeolite bases described above, other zeolitic bases may be employed such as the zeolitic cogels of silica and alumina, silica and titania, silica and zirconia, silica and magnesia and the like.

The Group VIII metal hydrogenating component is ordinarily added to the zeolite base by ion exchange with an aqueous solution of a suitable compound of the desired metal wherein the metal is present in a cationic form, as described for example in U.S. Pat. No. 3,236,762. Suitable amounts of the iron group metals, i.e., iron, cobalt and nickel, may range between about 1% and 20% by weight, while the noble metals, e.g. palladium and platinum, are normally employed in amounts ranging between about 0.1% and 2% by weight. The noble metals, particularly palladium and platinum, are preferred herein.

When catalysts of the foregoing description are utilized for extended periods of time at temperatures of e.g., 400°–950° F in hydrocarbon conversions such as hydrocracking, hydrogenation, isomerization, reforming and the like, a progressive decline in catalyst activity normally occurs as a result of coke deposition. A more rapid or sudden decline in activity will follow when the catalyst encounters, either during hydrocarbon conversion or during regeneration, any of the adverse conditions of temperature and water vapor partial pressure previously described. Deactivation by coking is almost completely reversible by conventional oxidative regeneration at temperatures of, e.g., 750°–1100° F. When it is found that such oxidative regeneration restores less than about 90% of the fresh hydrogenation activity, it may be assumed that some undesirable maldistribution of the hydrogenating metal has occurred. For practical purposes the rejuvenation procedure is generally and most usefully applied to catalysts which, upon conventional oxidative regeneration, regain from about 5% to 90% of their fresh hydrogenation activity. It will be understood that hydrogenation activity is measured in terms of, and is inversely proportional to, the volume of catalyst required to effect a given degree of hydrogenation per pass of a particular compound, e.g., benzene, at a particular set of hydrogenation conditions.

G. Hydrocracking Process Conditions

After activation by reduction with hydrogen at 700°–1000° F, the rejuvenated catalysts may be used for hydrocracking under the following operating conditions:

|  | Broad Range | Preferred Range |
|---|---|---|
| Temp. °F | 450 – 850 | 500 – 750 |
| Pressure, psig | 400 – 5000 | 800 – 2000 |
| LHSV | 0.2 – 10 | 0.5 – 5 |
| $H_2$/oil ratio, MSCF | 1 – 20 | 3 – 10 |

The above conditions are suitably correlated to effect about 20–80% conversion per pass to products boiling below the initial boiling point of the feed. Run lengths of at least about 6 months are easily achieved under such conditions. Suitable hydrocracking feedstocks include in general any mineral oil fraction boiling above about 300° F, and up to about 1200° F, any of which may be converted to products including gasoline, jet fuel, diesel fuel and the like.

The following examples are cited to illustrate the invention, but are not to be construed as limiting in scope.

EXAMPLE I

A commercial hydrocracking run was continued over a period of two years utilizing a catalyst consisting of 0.5 weight-percent Pd supported on a ⅛ inch copelleted composite of 20% $Al_2O_3$ and 80% of a Y molecular sieve cracking base having a $SiO_2/Al_2O_3$ mole-ratio of about 4.7, wherein about 35% of the zeolitic ion exchange capacity was satisfied by magnesium ions (3 weight-percent MgO), about 10 percent by sodium ions, and the remainder (55%) by hydrogen ions. The run was carried out at a pressure of about 1500 psig, with space velocities varying between about 1.3 and 1.7, hydrogen rates varying between 5,000 and 7,000 scf/b, and with hydrocracking temperatures progressively increasing from about 650° to about 720° F. The feedstock was a hydrofined gas oil (400°–850° F boiling range) containing $H_2S$ and $NH_3$ from the hydrofiner. Hydrocracking temperatures were incrementally raised during the run to maintain 40–50 volume percent conversion per pass to gasoline.

At the end of this run, a 15,000 pound batch of the catalyst was carefully regenerated by oxidative combustion at temperatures ranging from about 700° up to 1000° F, utilizing a regeneration gas comprising oxygen in amounts increasing from about 0.1 to 3.0 volume percent, whereby water vapor partial pressures were maintained at a value below about 0.25 psia at all regeneration temperatures above 500° F.

The regenerated catalyst was then activated in a stream of dry hydrogen at temperatures increasing 50° F per hour to 450° F, holding at 450° F for 6 hours, then increasing 50° F per hour to 700° F, and holding at 700° for 6 hours.

The activated catalyst was then tested for activity, compared to that of the fresh catalyst. The feedstock used for the activity test was a substantially nitrogen-free, 400°–850° F gas oil, doped with thiophene to a level of 0.48% sulfur to provide an $H_2S$-containing atmosphere for the hydrocracking. Conditions of the activity test were: pressure 1450 psig, LHSV 1.7, hydrogen/oil ratio 8,000 scf/b, conversion per pass 52–54 volume percent to gasoline. Activities are expressed in terms of the temperature required to maintain the stated conversion per pass. After 100 hours on stream, this temperature was more than 640° F for the regenerated catalyst versus 551° F for the fresh catalyst. Thus, the catalyst had lost over 89° F in activity not attributable to coke deposition.

EXAMPLE II

A sample of the catalyst regenerated as described above was treated according to the rejuvenation process of U.S. Pat. No. 3,899,441, as follows:
1. Allowed to hydrate at temperatures maintained below 250° F in a flowing stream of steam and nitrogen to saturation;
2. Treated with gaseous ammonia at ambient temperatures and pressures to substantially saturate the water in the catalyst pores (about 25–30 wt.% $NH_3$ based on water);
3. Allowed to stand in a closed vessel for 8 hours at ambient temperatures;
4. Purged with nitrogen at 125° F to remove excess ammonia;
5. Dried and calcined in flowing dry air at temperatures increasing gradually to 450° F, holding at 450° F until the dewpoint of the exiting gases is less than −10° F, and then increasing the temperature gradually to 930° F, and finally holding at 930° for 1 hour. At this stage the loss on ignition (LOI) of the catalyst was 3.3 wt.%, as determind by heating at 1832° F (1000° C) for 2 hours.

Upon activating the catalyst and activity testing as described in Example I, the 100-hour 52–54% conversion temperature was found to be 605° F. Thus, the prior art hydration-ammoniation treatment effected recovery of about 35° F of lost activity, but the catalyst was still about 54° F less active than the fresh catalyst.

EXAMPLE III

A portion of the partially rejuvenated catalyst from Example II was partially rehydrated by exposure to ambient air for 60 minutes, after which the catalyst contained 6.6 wt. % moisture, as determined by heating at 1000° C for 2 hours. After activating as described in Example I, the 100-hour 52–54% conversion temperature was found to be 568° F. Thus, the rehydration step brought about an additional recovery of 37° F in lost activity, rendering the catalyst only 17° F less active than fresh.

EXAMPLE IV

Another 15,000 pound batch of the original deactivated catalyst was regenerated as described in Example I. A portion of the regenerated catalyst was then subjected to the rejuvenation procedure of Example II, after which its 1000° C LOI was found to be 3.6 wt.%. Upon activating and activity testing this catalyst as described in Example I (except that a slightly more refractory feedstock was used), the 52–54% conversion temperature was found to be 608° F, versus 563° F for the fresh catalyst (with reference to the same test feed). Thus, hydration-ammoniation alone left 45° F of unrecovered activity.

EXAMPLES V-VIII

Four portions of the partially rejuvenated catalyst of Example IV were rehydrated to varying degrees, then activated and activity tested as in Example IV, with the following results:

Table I

| Example | V | VI | VII | VIII |
|---|---|---|---|---|
| Water content of rehydrated cat., wt.% | 4.7 | 8.1 | 11.3 | 17.7 |
| Temp. required for 52-54% conversion, °F | 581 | 577 | 580 | 616 |
| Percent recovery of fresh activity not recovered in Example IV | 60 | 69 | 62 | −18 |

The foregoing data clearly demonstrates the criticality of controlling the degree of rehydration. The following Example will show that the negative results of Example VIII are not improved by resorting to a slower heatup and drying of the fully hydrated catalyst during activation.

EXAMPLE IX

Another portion of the partially rejuvenated catalyst from Example IV was rehydrated to a saturation water content of 18.1 wt.%, and then activated as described in Example I, with the exception that temperatures were raised at a rate of 15° F/hour instead of the 50°/hour rate. Upon activity testing as in Example IV, the 52-54% conversion temperature was found to be 637° F at 84 hours on-stream, which is inferior to the results of Example VIII. It is thus apparent that the degree of initial rehydration is a critical factor.

The foregoing details as to specific catalysts and rejuvenation conditions are not intended to be limiting in effect. The following claims and their obvious equivalents are intended to define the true scope of the invention.

I claim:

1. A method for rejuvenating a catalyst comprising a non-zeolitic Group VIII metal supported on a siliceous zeolite base, said catalyst having been subjected to thermal and/or hydrothermal conditions resulting in a maldistribution of said Group VIII metal on said zeolite base with resultant reduction in hydrogenation activity, which comprises:
   A. contacting said catalyst in an oxidized or sulfided state and at a temperature below about 300° F with water or water vapor and with ammonia to adsorb therein about 5-40 weight-percent of water containing at least about 5 weight-percent of dissolved ammonia;
   B. drying and calcining the hydrated-ammoniated catalyst in a non-reducing atmosphere to effect deammoniation thereof, and dehydration to a water content of less than about 25% of its adsorptive capacity for water;
   C. partially rehydrating the calcined catalyst at a temperature below about 300° F to an extent of not more than about 80% and not less than about 10% of its adsorptive capacity for water; and
   D. activating the rehydrated catalyst for about 2-40 hours in a stream of essentially dry hydrogen at temperatures gradually increasing to a level between about 600° and 800° F.

2. A method as defined in claim 1 wherein said Group VIII metal is a noble metal.

3. A method as defined in claim 1 wherein said Group VIII metal is palladium.

4. A method as defined in claim 1 wherein said Group VIII metal is a noble metal and said zeolite base is a crystalline aluminosilicate molecular sieve.

5. A method as defined in claim 4 wherein said noble metal is palladium.

6. A method for rejuvenating a catalyst comprising a non-zeolitic Group VIII metal supported on a siliceous zeolite base, said catalyst having previously been utilized at elevated temperatures in a hydrocarbon conversion process to substantial deactivation, and having been subsequently regenerated by oxidative combustion to an activity level substantially below that of the original fresh catalyst, which comprises:
   A. contacting said regenerated catalyst at a temperature below about 300° F with water or water vapor and with ammonia to adsorb therein about 5-40 weight-percent of water containing at least about 5 weight-percent of dissolved ammonia;
   B. drying and calcining the hydrated-ammoniated catalyst in a non-reducing atmosphere to effect deammoniation thereof, and dehydration to a water content of less than about 25% of its adsorptive capacity for water;
   C. partially rehydrating the calcined catalyst at a temperature below about 300° F to an extent of not more than about 80% and not less than about 10% of its adsorptive capacity for water; and
   D. activating the rehydrated catalyst for about 2-40 hours in a stream of essentially dry hydrogen at temperatures gradually increasing to a level between about 600° and 800° F.

7. A method as defined in claim 6 wherein said Group VIII metal is a noble metal.

8. A method as defined in claim 6 wherein said Group VIII metal is palladium.

9. A method as defined in claim 6 wherein said Group VIII metal is a noble metal and said zeolite base is a crystalline aluminosilicate molecular sieve.

10. A method as defined in claim 6 wherein said Group VIII metal is a noble metal and said zeolite base is a Y zeolite.

11. A method as defined in claim 10 wherein said noble metal is palladium.

* * * * *